United States Patent [19]

Sato

[11] Patent Number: 4,472,751
[45] Date of Patent: Sep. 18, 1984

[54] TAPE RECORDER APPARATUS WITH PORTABLE PLUG-IN MODULE

[75] Inventor: Masaaki Sato, Hachioji, Japan

[73] Assignee: Olympus Optical Company Limited

[21] Appl. No.: 324,524

[22] Filed: Nov. 24, 1981

[30] Foreign Application Priority Data

Nov. 26, 1980 [JP] Japan ................... 55-166263

[51] Int. Cl.³ .............................................. G11B 15/00
[52] U.S. Cl. ........................................ 360/94; 360/137
[58] Field of Search ................. 360/94, 69, 96.1–96.6, 360/137

[56] References Cited

U.S. PATENT DOCUMENTS

| | | | |
|---|---|---|---|
| 3,964,099 | 6/1976 | Sato | 360/94 |
| 4,317,143 | 2/1982 | Osanai | 360/137 X |
| 4,373,172 | 2/1983 | Motoyama et al. | 360/96.4 X |

*Primary Examiner*—John H. Wolff
*Attorney, Agent, or Firm*—Toren, McGeady and Stanger

[57] ABSTRACT

A tape recording device consisting of a main module operative as a portable tape recorder including a first tape drive system and an adapter module having a second tape driving mechanism with which the first tape drive system of the main module may be arranged in cooperative relationship when the main module is coupled with the adapter module, the second tape driving mechanism including a large inertia flywheel through with which the first tape drive system of the main module cooperates when the main module is coupled with the adapter module.

2 Claims, 5 Drawing Figures

TAPE RECORDER APPARATUS WITH PORTABLE PLUG-IN MODULE

BACKGROUND OF THE INVENTION

1. Field of the Invention

The present invention relates to a tape recording device, and particularly to a portable type tape recording device, such as for example a miniature tape recorder, having a main module adapted to be coupled with an adapter so as to be capable of recording and reproducing functions.

2. Description of Prior Art

Recently, a trend has developed toward utilization of miniature stereo tape recorders for personal use with stereo headphones.

Such stereo tape recorders include cassettes tape recorders utilizing compact cassette tapes and ultraminiature size tape recorders of the type utilizing micro-cassette tapes.

Such a cassette stereo tape recorder produces excellent stereo sounds, since compact cassette tapes recorded with stereo sounds of good quality are readily available. By contrast, the ultraminiature tape recorder uses micro-cassette tapes on which stereo sounds are recorded which cannot be expected to produce excellent stereo quality sounds since an ultraminiature tape recorder involves relatively new technology and neither the hardware nor software for recording stereo sounds of high quality as yet been sufficiently developed.

However, the ultraminiature tape recorder is advantageous in that is literally so small that it can be carried in a pocket. Therefore, both motor and flywheel of very small size are used for the ultraminiature tape recorder. Accordingly, excellent stereo sounds cannot be readily enjoyed, because there occurs an appreciable feeling of nonuniform rotation in the tape recorder, when music recorded directly on a micro-cassette tape is reproduced by the tape recorder itself or through a high-fidelity reproducing system or the like.

SUMMARY OF THE INVENTION

An object of the present invention is to eliminate the above described disadvantage of the conventional ultraminiature tape recording device.

Another object of the present invention is to provide a tape recording device having a main module and an adapter module in combination so as to realize very high quality recording and reproducing functions.

According to the present invention, there is provided a tape recording device comprising a portable type main module including a drive system, and an adapter module arranged to be detachably coupled with the main module and having a tape driving mechanism including a large inertia flywheel to which the drive system of the main module is engaged when the main module is coupled with the adapter module.

In one preferred embodiment of the present invention, the drive system of the above-mentioned main module is provided with means for uncoupling those parts of the drive system which do not associate with the tape driving mechanism of the adapter module, when the main module is coupled with the adapter module.

Further, the uncoupling means includes an one-way clutch forming a transmission mechanism through which the motor torque from the adapter module is transmitted to a capstan in the main module, but by which the motor torque from the main module is isolated from the adapter module.

DESCRIPTION OF THE PREFERRED EMBODIMENT

Figure 1:
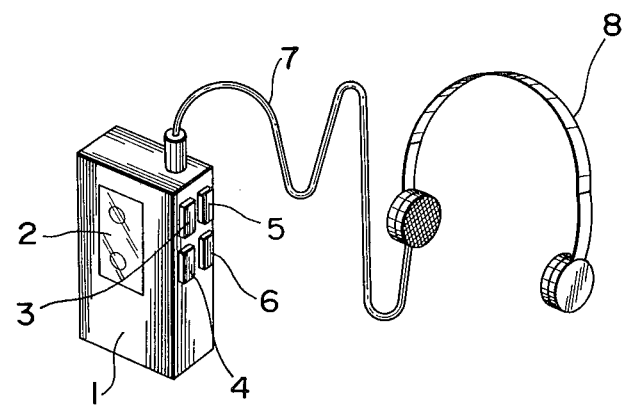
FIG. 1 is a perspective view illustrating a main module used in a tape recording device of one embodiment of the present invention.

Referring first FIG. 1 in which is shown a portable ultraminiature stereo tape recorder for playback or reproducing only, reference numeral 1 denotes a main module of the tape recoder which is provided with a cassette receiving chamber 2 in the front thereof, a play button 3, a stop button 4, a forwarding button 5 and a rewinding button 6, and to which a stereo headphone 8 is connected through a jack plug cord 7. Although the main module 1 is used for reproducing only, an erasing head (which is not shown) and a stereo magnetic head (which is also not shown) serving both for recording and reproducing functions are also provided in the main module 1 in order to adapt it for use with an adapter module which is explained hereinunder and which is coupled with the main module 1.

Figure 2:
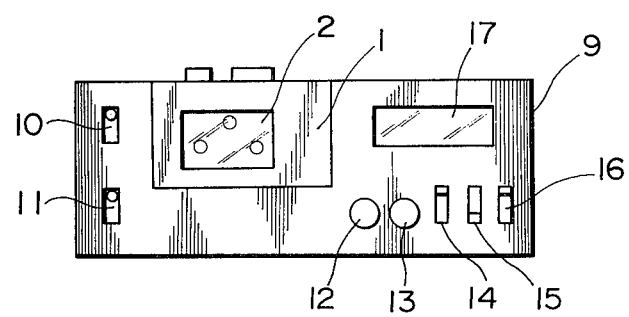
FIG. 2 is a front elevational view of the tape recording device of the same embodiment, in which the main module shown in FIG. 1, is coupled to the adapter module.

The main module 1 has a construction such that it may be detachably coupled with the adapter module 9 as shown in FIG. 2. The adapter module 9 has a reproducing circuit (which is not shown) for producing output signals obtained by amplifying reproducing signals from the stereo magnetic head, and a recording circuit (which is also not shown) for delivering recording signals to the stereo magnetic head and erasing signals to the erasing head, which circuits are arranged to be electrically connected with the main module 1 through a connector (which is not shown) when the main module 1 is coupled with the adapter module 9. In the front side, the adapter module 9 has a power switch 10, a recording-reproducing changeover switch 11, right-hand and left-hand volume knobs 12, 13 and ON-OFF switch 14 for noise reduction, a reproducing equalizer changeover switch 15, a bias changeover switch 16 and a level meter 17. In order to obtain a large inertia or a great flywheel effect the adapter module 9 is provided with a tape driving mechanism 18 which is arranged to associate with a tape drive system 19 of the main module 1 so as to drive the latter.

Figure 3:
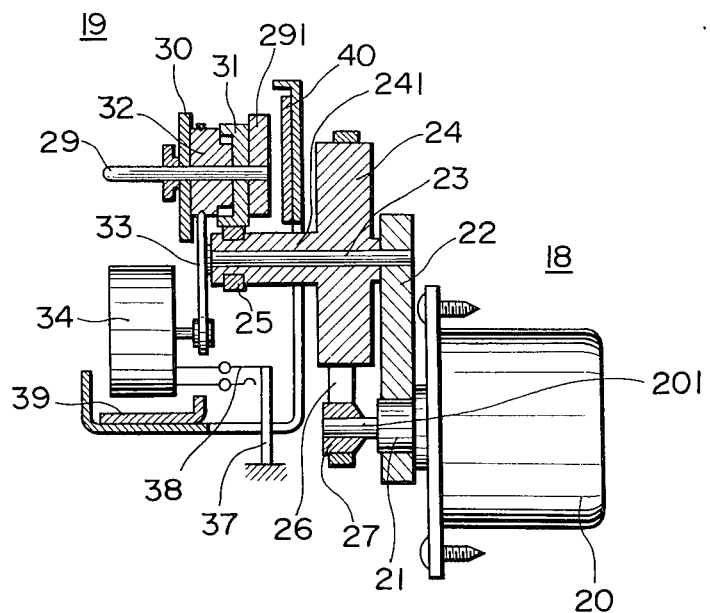
FIG. 3 is a detailed view in which a coupling condition between the drive system of the main module and the driving mechanism of the adapter module is shown in a partially broken cross-sectional illustration.
Figure 4:
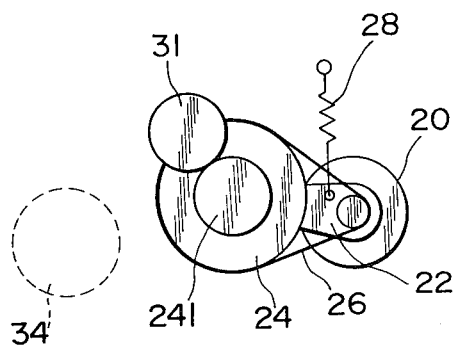
FIG. 4 is a side view illustrating one part of FIG. 3 in an enlarged and simplified form.

FIG. 3 shows the abovementioned arrangement. In the tape driving mechanism 18 of the adapter module 9, a motor 20 is provided with a bearing having an outer race 21 rotatably carrying an arm 22 which in turn rotatably supports, at the free end thereof, a flywheel 24 through a shaft 23. The flywheel 24 has a relatively large diameter to obtain a sufficient flywheel effect, and is formed with a small diameter portion 241 in the center thereof, which has a free end portion fitted therearound with a friction member 25 made of, for example, rubber materials. The flywheel 24 is driven by the motor 20 through a drive belt 26 wound around a pulley 27 fitted onto a rotating shaft 201 of the motor 20. In this state, the relative arrangement of the motor 20, the arm 22 and the flywheel 24 is shown in FIG. 4 illustrating the side view thereof. Further, in this state the arm 22 is biased toward the clockwise direction by means of a spring 28.

Meanwhile in the tape drive system 19 of the main module 1 a capstan 29 is rotatably mounted to a chassis 291. The capstan 29 carries a flywheel 30 and a transmission pulley 31 which are spaced at a predetermined distance and are integrally incorporated with the capstan 29. Further, between the flywheel 30 of the capstan 29 and the transmission pulley 31 a pulley 32 is rotatably disposed. The pulley 32 is driven by a motor 34 through a belt 33.

Figure 5:
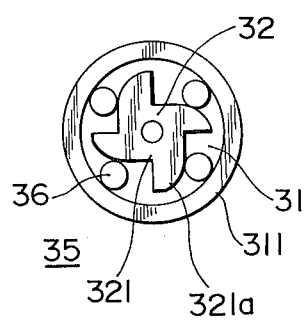
FIG. 5 is a cross-sectional view schematically illustrating a torque transmitting mechanism.

Referring to FIG. 5, a rotary transmission mechanism 35 composed of a one-way clutch is provided between the pulleys 31, 32. The transmission mechanism 35 has a projecting wall 311 formed along the periphery of one side surface, opposed to the pulley 32, of the pulley 31, a cam 321 having a plurality of hook-like projecting portions 321a (4 in number in this embodiment as shown in FIG. 5) and formed on the one side surface, opposed to the pulley 31, of the pulley 32, and members 36 disposed between the cam 321 and the projecting wall 311 receiving thereinto the cam 321. With this arrangement of the transmission mechanism 35, the rotation of the pulley 32 in the direction of the indicated arrow by the motor 34 is transmitted to the pulley 31 so as to drive the capstan 29, while the rotation of the pulley 31 in the direction of the indicated arrow is prevented from being transmitted to the pulley 32. Thus, the transmission mechanism 35 is arranged to isolate the motor 34 and its associated parts in the tape drive system 19 of the main module 1, which do not cooperate with the tape driving mechanism 18 of the adapter module 1.

Further, the friction member 25 fitted onto the small diameter portion 241 of the flywheel 24 in the tape driving mechanism 18 of the adapter module 9, is pressingly abutted against the peripheral surface of the pulley 31 through the bias force by the spring 28.

Furthermore, reference numeral 37 in FIG. 3 denotes a pin arranged to open a power source switch 38 for the motor 34 of the main module 1, when the latter is coupled with the adapter module 9. Reference numerals 39, 40 denote parts of a cover of the main module 1, which are arranged to open when the main module 1 is coupled with the adapter module 9 so as to make it possible to operationally connect the main module 1 to the adapter module 9.

In the operation of the preferred embodiment of the invention described herein, when the main module 1 of the tape recorder is used alone, the main module 1 is only handled with the stereo headphone 8 being connected thereto. Therefore, stereo sounds can be enjoyed while the main module 1 is carried as a portable unit. In this case, the main module 1 of the tape recorder is used as a means for reproducing or playback only.

When the main module 1 is coupled with the adapter module 9 as shown in FIG. 2, the reproducing circuit and the recording circuit (which are both not shown) are automatically connected to the main module 1 through the connector. At the same time, the small diameter portion 241 of the flywheel 24 in the tape driving mechanism 18 of the adapter module 9 is inserted into the main module 1 so that the friction member 25 in the free end portion of the small diameter portion 241 is pressingly contacted against the peripheral surface of the pulley 31 in the tape drive system 19 of the main module 1 through the bias force by the spring 28.

In this state, the tape recording device composed of the main module 1 and the adapter module 9 is set on the recording mode or the reproducing mode. Therefore, the flywheel 24 is rotated by the motor 20, when it is started, through the belt 26 so that through the friction member 25 of the small diameter portion 241 the pulley 31 of the tape drive system 19 of the main module 1 is rotated, thereby to rotate the capstan 29. Meanwhile in the main module 1, the motor 34 is prevented from starting, since the pin 37 inserted into the main module 1 opens the power source switch 38 when the main module 1 is coupled with the adapter module 9. The pulley 32 which is driven by the motor 34 through the belt 33, is also prevented, by the function of the transmission mechanism 35, from receiving a torque transmitted through the pulley 31.

Accordingly, with the above-mentioned arrangement in which the main module 1 is coupled with the adapter module 9, the capstan 29 of the main module 1 is rotatably driven through the large diameter flywheel 24 in the tape driving mechanism 18 of the adapter module 9 so that a sufficient flywheel effect can be obtained when the tape recording device is operated in the recording or reproducing mode, thereby to completely eliminate nonuniformity in rotational operation of the tape recorder device. Therefore, by the tape recording device according to the present invention, recording of very high quality can be expected and sound reproduction of very high quality can be also attained through a high fidelity (Hi-Fi) reproducing unit. Particularly, when the main module 1 of the tape recorder is solely handled with a micro-cassette tape recorded by the tape recording device of the above-mentioned arrangement, excellent stereo sounds can be enjoyed.

Although the present invention is explained in one preferred embodiment as above-mentioned, the present invention is not limited by this embodiment but may be variously modified within the scope of the appended claims. For example, in the above-mentioned embodiment, although the main module of the tape recorder is explained as used for reproducing only, the main module may have both recording and reproducing functions. Further, the tape recording device is explained as stereo type, but the present invention may also be applied to monoral type tape recording devices.

While a specific embodiment of the invention has been shown and described in detail to illustrate the application of the inventive principles, it will be understood that the invention may be embodied otherwise without departing from such principles.

What is claimed is:

1. Audio type apparatus comprising:
   a main module consisting of a portable tape playback mechanism having a first tape drive system including a capstan;
   an adapter module arranged to have said main module releasably coupled in operative engagement therewith, said adapter module having a second tape drive system including a large inertia flywheel;

connector means for connecting said capstan of said main module in driving engagement with said second tape drive system of said adapter module to enable said main module to be placed in driven cooperation with said large inertia flywheel; and uncoupling means for rendering inoperative parts of said first tape drive system when said main module is in coupled engagement with said adapter module.

2. Apparatus according to claim 1 wherein said first tape drive system of said main module includes a first motor, wherein said second tape drive system of said adapter module includes a second motor and wherein said uncoupling means comprise a one-way clutch through which rotation of said first motor of said adapter module is transmitted to said capstan of said main module but whereby the rotation of said second motor of said main module is isolated so as to be prevented from transmitting driving torque to said second tape driving mechanism of said adapter module.

* * * * *